Jan. 1, 1963     C. F. STEARNS     3,071,009

ISOCHRONOUS-DROOP GOVERNOR

Filed May 3, 1960

N, O & P ARE OPERATING LINES FOR DIFFERENT LOAD CONDITIONS

INVENTOR
CHARLES F. STEARNS
BY Harris G. Luther
ATTORNEY

United States Patent Office 3,071,009
Patented Jan. 1, 1963

3,071,009
ISOCHRONOUS-DROOP GOVERNOR
Charles F. Stearns, East Longmeadow, Mass., assignor to United Aircraft Corporation, East Hartford, Conn., a corporation of Delaware
Filed May 3, 1960, Ser. No. 26,450
10 Claims. (Cl. 73—521)

This invention relates to governors and particularly to mechanism for changing the functioning of a governor between isochronous and droop or proportional governing.

An object of this invention is mechanism which will automatically, at a preselected speed, change the governor from a droop or proportional governor to an isochronous governor.

A further object is mechanism which will, at a preselected value or control position, change an isochronous governor into a droop or proportional governor.

A still further object is mechanism for disabling governor servo mechanism and connecting the governor directly with the valve or control member.

These and other and additional object and advantages will be apparent from the following specification and the accompanying drawings in which.

This mechanism has been devised to automatically schedule the change from isochronous governing to droop governing or vice versa and has been shown as incorporated in a fuel control device for purposes of illustration. The device schedules the transition as a function of speed (r.p.m.) and the fuel flow required. Referring to curve 1 and the following definitions:

*Droop governor.*—A governing device which governs by increases in r.p.m. from a set value, decreasing fuel flow.

*Isochronous governor.*—A governing device which holds a set speed regardless of fuel flow requirements.

Figure 1:
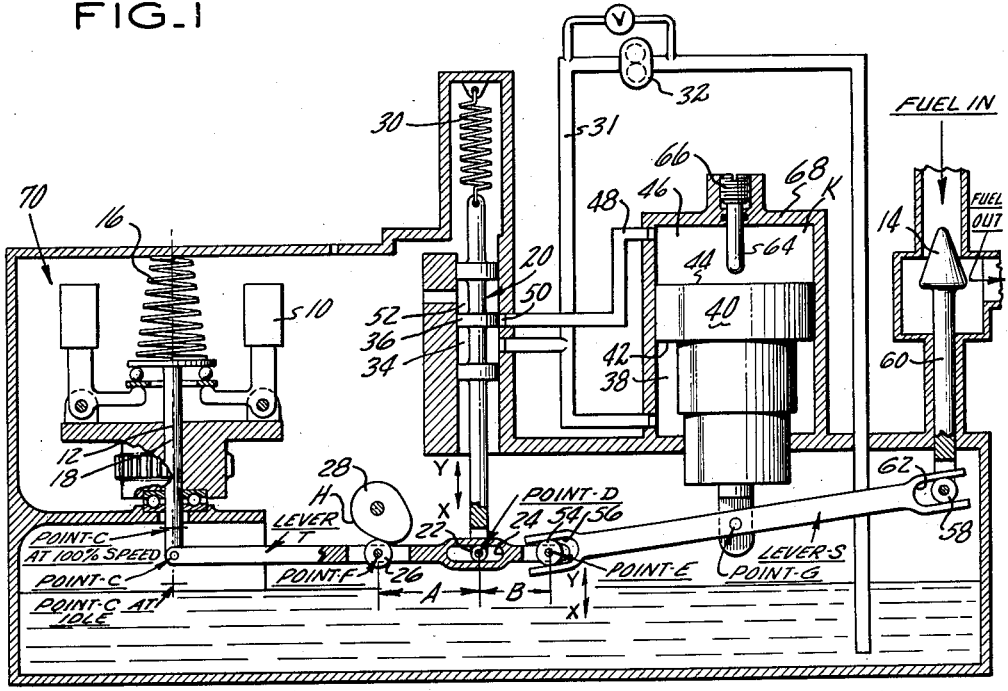
FIGURE 1 is a schematic showing of mechanism incorporating the invention.
Figure 2:
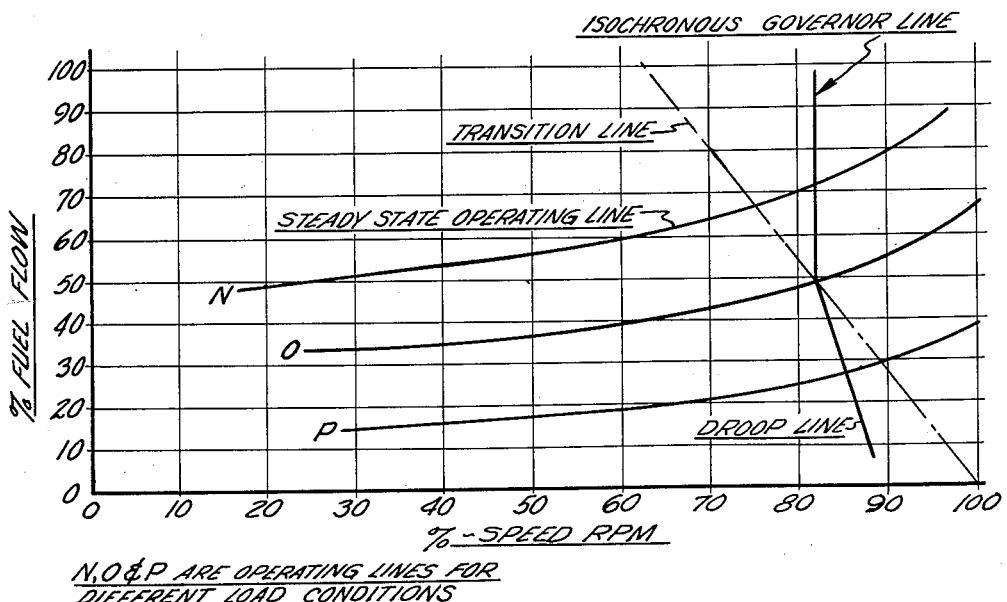
FIGURE 2 is a graph illustrating the operational characteristics of the mechanism of FIGURE 1.

Referring to curve FIGURE 2, and tracing the types of governors, first consider the droop type governor. Set the governor at 82% speed at a load condition which would require a steady state line O. This condition requires a fuel flow of 48% of max. Now, if the load changes so that the new steady state operating line is now P, the speed must increase to reduce fuel flow. Since 48% fuel flow is too much fuel flow for a new operating line, the engine will increase speed. The droop governor will reduce fuel flow along the droop line until an intersection with the new operating requirements is established. So, from the set value of 82% speed, the change in load increased the speed to 85% before an equilibrium point was reached.

The isochronous governor, on the other hand, would have accomplished the required change in fuel flow without any change in speed. This ability to hold a constant speed is the chief advantage which an isochronous governor holds over a droop type governor. To make an isochronous governor stable, it must be made to act slowly. The droop governor, on the other hand, is a more stable and simpler device. The ability of the droop governing device to act rapidly and stably is one of the big advantages that the droop governor has to its credit.

There are jet engine characteristics that make it very desirable to have droop governing below and isochronous governing above certain speeds. Referring to curve FIG. 2 again, the transition device allows isochronous governing at any speed above the transition line and droop governing at speeds below this transition line. It can be seen from the curve that isochronous and droop governing may occur at the same speed, depending upon the load imposed on the engine.

Considering in detail the structure chosen to illustrate this invention, the flyballs 10 are rotated about the axis 12 in timed relation with the engine or device, not shown, whose speed is controlled by the fuel or throttle valve 14 positioned by the governor and controlling the flow of fuel to the engine. Centrifugal force acting on the flyballs 10 is opposed by speeder spring 16 and positions the rod 18 in accordance with the speed of rotation of the flyballs.

A servo valve 20 is connected to rod 18 by a lever T, which is pivotally connected by pivot joint C at one end, to rod 18 and is pivotally and translatingly connected to servo valve 20 by a roller 22 rotatably journalled at D on the lower end of valve 20 and movable in a slot 24 intermediate the ends of the lever T. A roller 26, journalled on lever T between the points C and D is held against cam 28 by any suitable means, shown schematically as a tension spring 30 at the upper end of valve 20. Cam 28 may be positioned by any suitable mechanism, not shown, either manually or automatically, to select the governor operating speed.

Fluid under pressure is supplied to line 31 from any suitable source, schematically shown as a pump 32. Line 31 leads the pressure fluid to the space 34 under the land 36 of valve 20 and also to the chamber 38 under the servo piston 40. It will be noted that the active area 42 of piston 40 exposed to chamber 38 is much less than the area 44 exposed to chamber 46 above the piston. Chamber 46 is connected by pipe 48 to a port 50 controlled by land 36 of valve 20. Space 52 of valve 20 is vented to drain or a low pressure area. Movement of valve 20 upward will direct pressure fluid to space 46 and force piston 40 down and movement of valve 20 downward will vent space 46 and the pressure in space 38 will force piston 40 upward.

Piston 40 is connected by pivot joint G to a point intermediate the ends of lever S which is connected at one end by a fork and roller connection to lever T and at the other end by a fork and roller connection to fuel control valve 14. At the lever T connection a roller 54 is journalled at E on lever T adjacent the end thereof and spaced from point D and is slideably mounted in fork 56 at one end of lever S. At the valve end roller 58 is journalled on one end of valve stem 60 of valve 14 and is slideable in slot 62 at the other end of lever S.

An adjustable stop 64, threaded at 66 into the piston housing 68 may be adjusted to limit the upward movement of piston 40 at any desired point and thus determine the transition point between isochronous and droop governing.

From the above it will be apparent that with piston 40 free to move each off speed excursion of governor 70 will result in movement of valve 20 from its centered position which will cause piston 40 to move valve 14 to alter fuel flow and change the engine speed until the governor returns to on speed position which will return the valve 20 to its centered position and hence always maintain the same speed—isochronous. If on an overspeed excursion, which will move valve 20 downward, and try to move piston 40 upward, piston 40 is prevented by stop 64 from moving upward, then valve 14 will be positioned only by the changed position of the governor. Valve 14 will start to close to try to correct the overspeed but will be unable to completely do so because the governor must operate at an increased speed to close the valve, so that an equilibrium will be reached with the governor off speed and the valve in a position corresponding to the governor off speed condition. Each off speed will have a corresponding valve position—droop or proportional governing. It will be apparent that the transition point is determined by both speed and load or valve position.

The operation of the device may be described as follows: The flyballs 10 sense speed and provide the necessary speed signal by assuming different positions for different speeds. The speed setting cam 28 is used to set the desired speed and determine the on-speed position of the governor.

Now trace the isochronous governor through the system. Setting a speed of 100% (point H) on the speed setting cam 28 from some lower speed position will cause the pilot valve 20 to move in direction Y and lever S to increase fuel flow. At the same time the reset piston 40 has started to move in direction X slowly because the pilot valve has put high pressure into chamber 46 which has overcome the pressure force exposed to the other side 42 of the piston 40. The piston 40 moving in this direction also increases fuel flow. The engine (not shown) by this time has started to increase in speed because of the excess fuel flow. When it reaches 100% speed the pilot valve 20 is line on line or centered and the pressure in chamber 46 is modulated so that the piston 40 is in equilibrium. Notice that during the isochronous governing the pilot valve 20 reaches a steady state position which is always line on line which is the on-speed position of the governor. If the load imposed on the engine is such as to require less fuel flow, then the engine will speed up. This will cause the pilot valve to move in direction X, venting chamber 46 more to drain or low pressure, thereby reducing the pressure in chamber 46 and causing the reset piston 40 to move towards decreased fuel flow. The reset piston 40 will move to a new position which will satisfy the new fuel flow requirements at 100% speed. When this position is reached, the speed will drop back to 100% which will cause the pilot valve 20 to be line on line and modulate the pressure acting on the piston to equilibrium.

It can now be seen that the reset piston can have various positions at a given speed. At this set speed which is the governor on-speed position, lever T will only have one position but lever S may have many.

Droop governing is accomplished when the reset piston 40 is against the adjustable stop 64. In this condition the reset piston 40 adds nothing to the position of lever S and therefore nothing to the throttle valve 14 opening. An increase in speed causes the flyballs 10 to move out, compressing the flyball spring 16, and causing the pull rod 18 to move (point C on lever T) upward toward 100% speed point. Lever T pivots about point F, causing point E to move in the direction X. Lever S then pivots about point G and closes the throttle valve 14. As long as the reset piston 40 does not move, the engine (not shown) will be governed by a droop governor. It can be seen that in order to keep the reset piston 40 against the stop 64, the pilot valve 14 must always be in direction X from the line on line or centered position, thereby venting chamber K to low pressure.

Referring to the schematic, ordinary isochronous governing devices have the point D of the pilot valve at point E. This would make the system a pure isochronous governor. Now the unique portion of the device sketched can be illustrated. Because point D is not at point E but at some other ratio between point F and E and because the pilot valve 20 must be line on line during isochronous governing, notice that E assumes different positions for different speeds. If the reset piston 40 could reset fuel flow from max. down to 0 fuel flow at 100% speed, then as lower and lower speeds are set into the governor, point E moves further and further in direction Y. This means that the reset piston 40 hits the adjustable stop 64 at a higher and higher fuel flow and that the reset piston 40 can only reset fuel flow from the value at the stop to a higher value. If the load imposed on the engine requires a fuel flow lower than the value that the reset piston 40 can reset, the droop governor must take over at which time the flyballs 10 are turning at a value higher than that which was set at the cam. When this happens, the pilot valve 20 must move in direction X from the line on line position. The lower the fuel flow requirements the further the pilot valve 20 is from the line on line position. This type of operation can be seen on the curve at 82% speed. If the engine is operating on steady state curve N at 82% speed and the load imposed is reduced to steady state curve O, the engine speed will not change but, at this point, the reset piston 40 is just at the adjustable stop. Any further reduction in load, say to steady state operating line P, the governor 70 must move down the droop line and increase speed. As the speed is reduced below the point at which the reset piston 40 is setting 100% fuel flow when it is against the stop 64, the system is capable only of droop governing. The ratio of distance A to distance B determines the slope of the transition line and the adjustable stop 64 determines the minimum fuel flow that the piston can reset at 100% speed. The adjustable stop 64 can be set so that the transition line will intersect the 100% speed line at any value of fuel flow. This device accomplishes transition from an isochronous to a droop governor without any additional mechanism than that required for an isochronous governor.

I claim:

1. In combination with a speed responsive governor, a control element, means positioning said element in accordance with the governor speed so that each particular speed provides a predetermined different element position, means rendered operative at a selected speed to disable said positioning means and position said element in various positions independent of any particular governor speed to maintain a constant governor speed.

2. In combination with a speed responsive governor, a control element, means responsive to an off-speed speed of said governor positioning said element to maintain a constant speed of said governor, means disabling said first mentioned means at a preselected element position and positioning said element in accordance with the governor speed so that each governor speed has a corresponding element position.

3. In combination with an isochronous governor, having a device positioned in accordance with governor speed, a control element, means connecting said element with said device to provide isochronous governing, and means, effective at a preselected speed and element position, connecting said element directly with said device to change the isochronous governor to a droop governor.

4. In combination with a speed responsive governor, a control element, means connecting said element with said governor, servo mechanism forming a part of said connecting means and having on speed and off speed positions to position said element to maintain a constant speed of said governor, and means disabling said servo mechanism and connecting said governor directly with said control element to give said element a definite position for each governor speed.

5. In combination with a speed responsive governor, a control element, means operatively connecting said element with said governor to position said element by said governor, servo mechanism forming a part of said connecting means, and including a servo valve positioned by said governor and having a centered position, a servo piston controlled by said valve and positioned by off center positions of said valve, means connecting said servo piston with said element to position said element independently of the governor to provide isochronous governing, and means disabling said piston and servo mechanism to limit positioning of said element to said governor to provide droop governing.

6. A combination as claimed in claim 5 in which said disabling means comprises an adjustable stop limiting movement of said piston in an element speed reducing direction.

7. In combination with a speed responsive governor and a control device, means connecting said governor with said device to position said device by said governor comprising, a pair of levers pivotally connected together at one end of each lever, each lever pivotally supported intermediate its ends, one lever pivotally connected at its other end to said governor and the other lever pivotally connected at its other end to said device, mechanism actuated by said one lever positioning the pivotal support of said other lever to additionally position said device, and means disabling said mechanism at a selected position.

8. A combination as claimed in claim 7 in which said mechanism comprises a servo valve having a central on-speed position and a servo piston positioning the pivotal support of said other lever and actuated by movement of said valve away from the on-speed position, and said disabling means comprises an adjustable stop limiting movement of said piston.

9. A combination as claimed in claim 7 in which the servo valve is connected to said one lever between the pivotal support for said one lever and the pivotal connection connecting said levers together.

10. A combination as claimed in claim 7 including means for adjusting the pivotal support of said one lever to adjust the governor speed setting.

References Cited in the file of this patent

UNITED STATES PATENTS

| | | |
|---|---|---|
| 1,725,783 | De Florenz | Aug. 27, 1929 |
| 2,252,838 | Drake | Aug. 19, 1941 |
| 2,309,892 | Gabalis | Feb. 2, 1943 |
| 2,452,088 | Whitehead | Oct. 26, 1948 |
| 2,602,654 | Parker | July 8, 1952 |
| 2,931,375 | Lewis | Apr. 5, 1960 |

FOREIGN PATENTS

| | | |
|---|---|---|
| 292,085 | Germany | May 25, 1916 |